United States Patent [19]

Furomoto

[11] Patent Number: 4,638,958

[45] Date of Patent: Jan. 27, 1987

[54] FISHING REEL

[75] Inventor: Yoshiyuki Furomoto, Sakai, Japan

[73] Assignee: Shimano Industrial Company Limited, Osaka, Japan

[21] Appl. No.: 757,474

[22] Filed: Jul. 22, 1985

[30] Foreign Application Priority Data

Jul. 27, 1984 [JP] Japan ............... 59-115114[U]

[51] Int. Cl.⁴ ............................................. A01K 89/04
[52] U.S. Cl. .......................... 242/84.1 R; 242/157 R; 254/389
[58] Field of Search .......... 242/84.1 R, 84.3, 211–221, 242/157 R; 226/196, 197; 254/389, 394

[56] References Cited

U.S. PATENT DOCUMENTS

| 569,128 | 10/1896 | Guild | 242/84.1 R |
| 1,869,441 | 8/1932 | Shakespeare, Jr. | 242/84.1 R |
| 1,871,386 | 8/1932 | Pflueger | 242/84.1 R |
| 2,329,982 | 9/1943 | Coxe | 242/216 |
| 3,506,214 | 4/1970 | Laszlo | 242/84.3 |

FOREIGN PATENT DOCUMENTS 18726  8/1903  United Kingdom .......... 242/84.1 R

Primary Examiner—Billy S. Taylor
Attorney, Agent, or Firm—Stevens, Davis, Miller & Mosher

[57] ABSTRACT

A fishing reel includes a spool rotatably supported between a pair of side frames, and a guide member mounted across the side frames. The guide member includes an elongate bore which extends axially relative to the spool and both lengthwise ends of which are positioned inwardly of opposite inner surfaces of the side frames. The periphery of the elongate bore includes curved drawn-line guide surfaces for guiding the fishing line as it is wound onto or drawn out of the spool.

3 Claims, 8 Drawing Figures

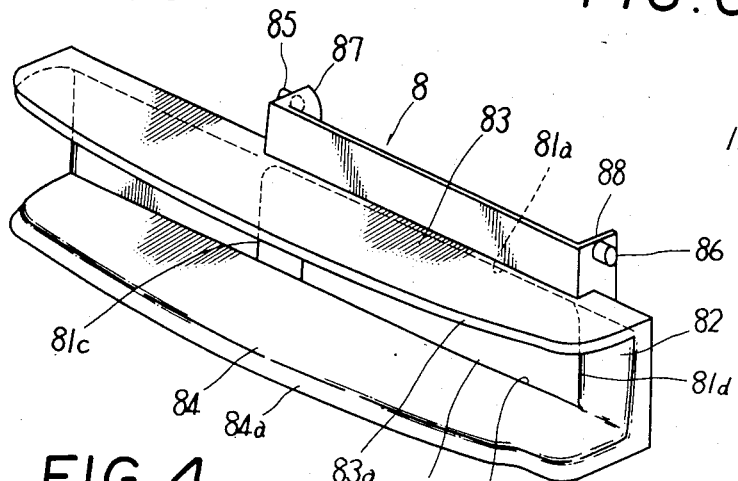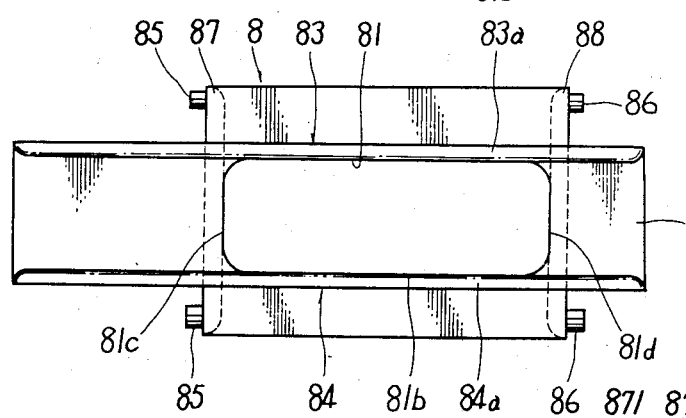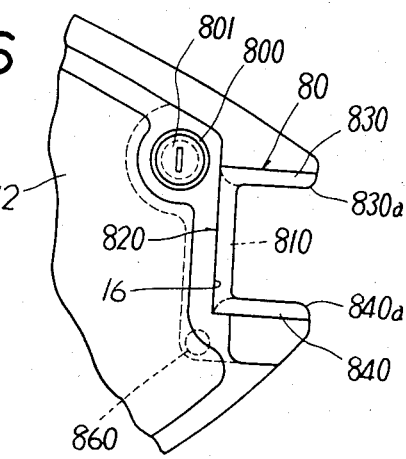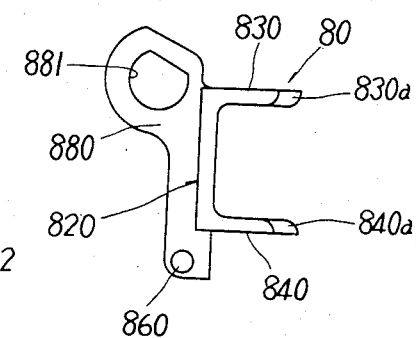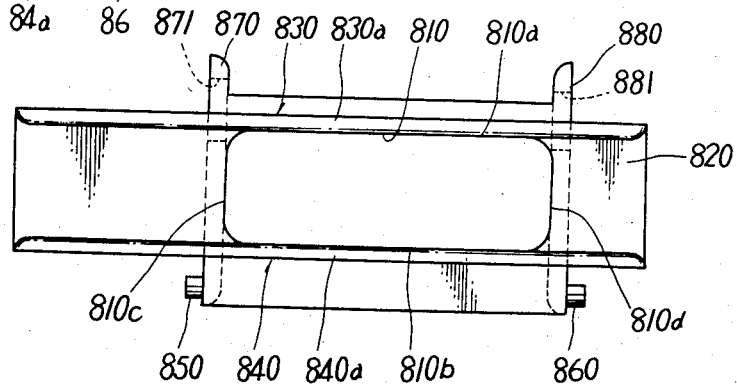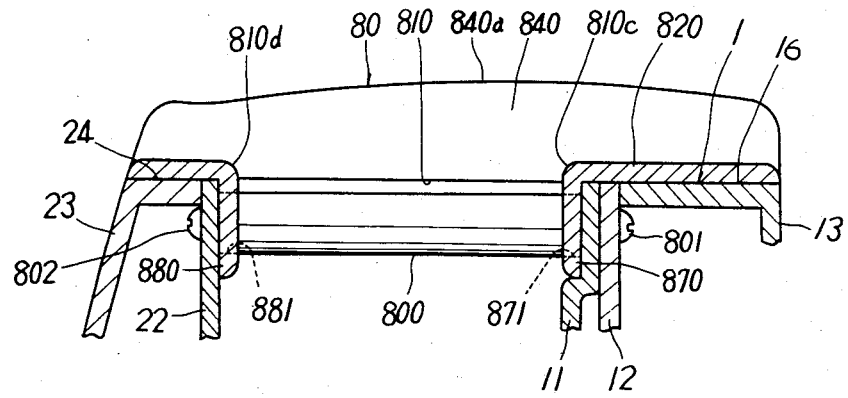

FISHING REEL

FIELD OF THE INVENTION

This invention relates to a fishing reel, and more particularly to a fishing reel in which a spool is rotatably supported between a pair of side frames of the reel and the spool is rotatably driven by a drag mechanism when selectively engaged therewith by a clutch means, to thereby wind a fishing line onto the spool or to enable it to be drawn out of the spool while the spool freely rotates.

BACKGROUND OF THE INVENTION

A conventional fishing reel constructed as described above is used by an angler such that he casts the line drawn out from the rotatable spool, or draws it out beforehand to a predetermined length and then throws the fishing ring (e.g., a lure) attached to the end of the line to a target point to catch a fish, such as a black bass. In the latter technique, he grips the line with his hand to draw it out of the spool, so that the direction in which the line is drawn out is variable. The angler, even when using a fishing reel provided with line guide rods, may often pull it in a direction such that it comes out of the guide rods.

A fishing reel has been proposed which is provided with a pair of guide rods positioned in front of the spool and between a pair of opposite side plates so that the line is drawn out from the spool to pass between the guide rods.

In this type of fishing reel, the line, when drawn out perpendicularly to the axis of rotation of the spool, is guided smoothly by the guide rods, thereby avoiding wearing of or damage to the line. The line, however, when pulled lengthwise of the guide rod, may contact with the front corner of the side frame carrying the guide rods. As a result, a problem exits in that the line may be worn or damaged, thus resulting in its becoming prone to snapping during fishing.

SUMMARY OF THE INVENTION

In order to solve the above problem, this invention has been designed. An object thereof is to provide a fishing reel which can guide the line in any direction without the line becoming damaged.

This invention is characterized in that a fishing reel, which includes a reel body having a pair of side frames, a spool disposed therebetween and journalled thereto, a drive mechanism for driving the spool, and a clutch means for engaging or disengaging the spool relative to the drive mechanism, is provided with a guide member having an elongate bore which extends axially of the spool. Both lengthwise ends of the bore are positioned inwardly of opposite inner surfaces of the side frames. The guide member is disposed in front of the spool and between the side frames. The overall periphery of the elongate bore at the guide member has drawn-line guide surfaces comprising curved surfaces for guiding the line passing through the elongate bore.

Thus, the line drawn out from the spool passes through the elongate bore at the guide member to be guided by the guide surfaces, whereby the line is subjected to less resistance and avoids wearing or damage regardless of the direction in which the line is pulled.

The guide member can be formed of a rectangular flat plate, but preferably includes two lips extending from the widthwise ends of the flat plate perpendicularly thereto. In this construction, at four sides of the elongate bore are formed first guide surfaces comprising curved faces for guiding the line passing through the elongate bore and at the utmost ends of the lips are formed second guide surfaces for guiding the line pulled outwardly from the lips and vertically with resepct thereto.

Also, the guide member is disposed between the side frames and fixed thereto through a mounting body interposed therebetween.

Thus, the line pulled through the elongate bore, even in any direction by the angler, is protected from damage caused from contact with the edge of each side frame.

The above and further objects and novel features of the invention will be more fully apparent from the following detailed description when read in connection with the accompanying drawings.

BRIEF DESCRIPTION OF THE DRAWINGS

FIG. 3 is a perspective view of a guide member only, FIG. 4 is a front view thereof, and FIGS. 5 through 8 show a modified embodiment of the invention, in which FIG. 5 is a partial cross-sectional plan view thereof corresponding to FIG. 1, FIG. 6 is a partial side view of the same corresponding to FIG. 2, FIG. 7 is a side view of the guide member only, and FIG. 8 is a front view thereof, corresponding to FIG. 4.

DETAILED DESCRIPTION OF THE INVENTION

Figure 1:
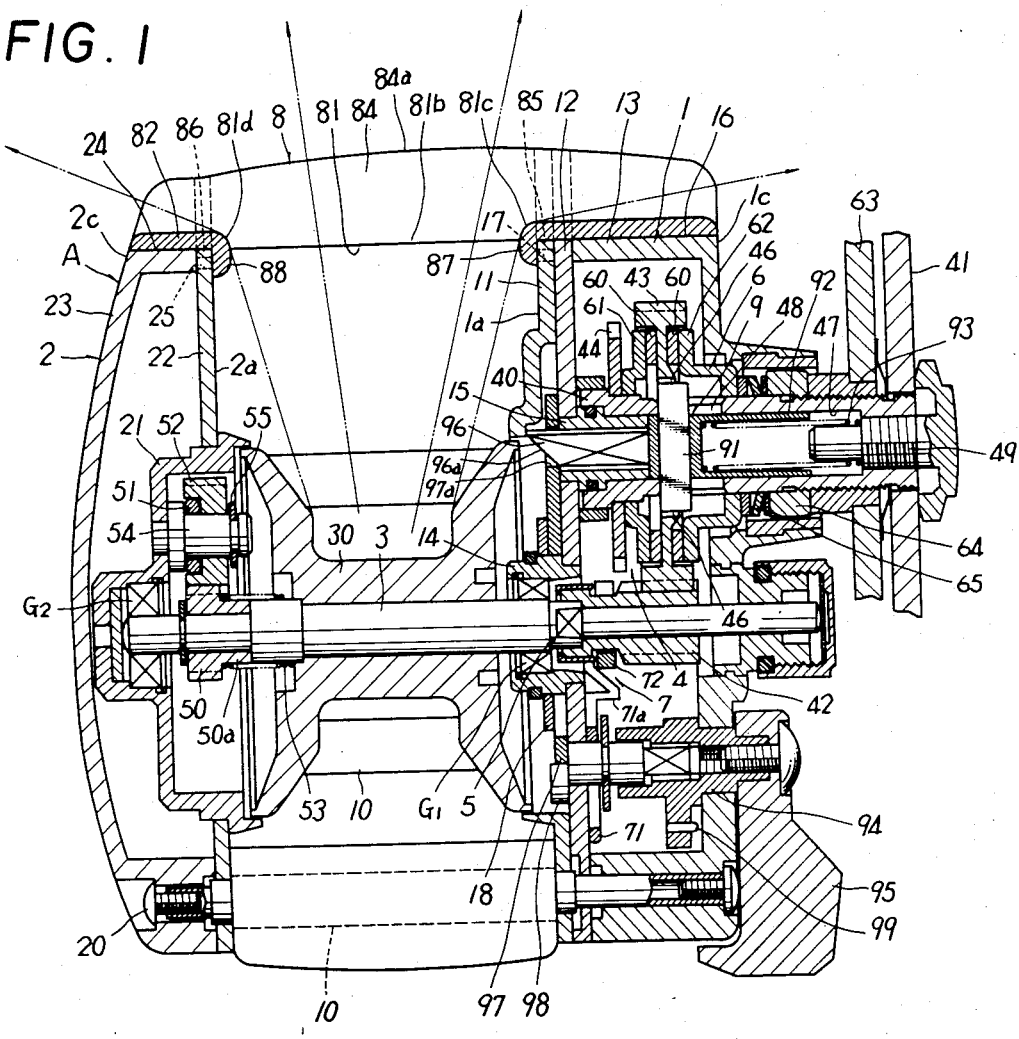
FIG. 1 is a cross-sectional plan view of an embodiment of a fishing reel of the invention.
Figure 2:
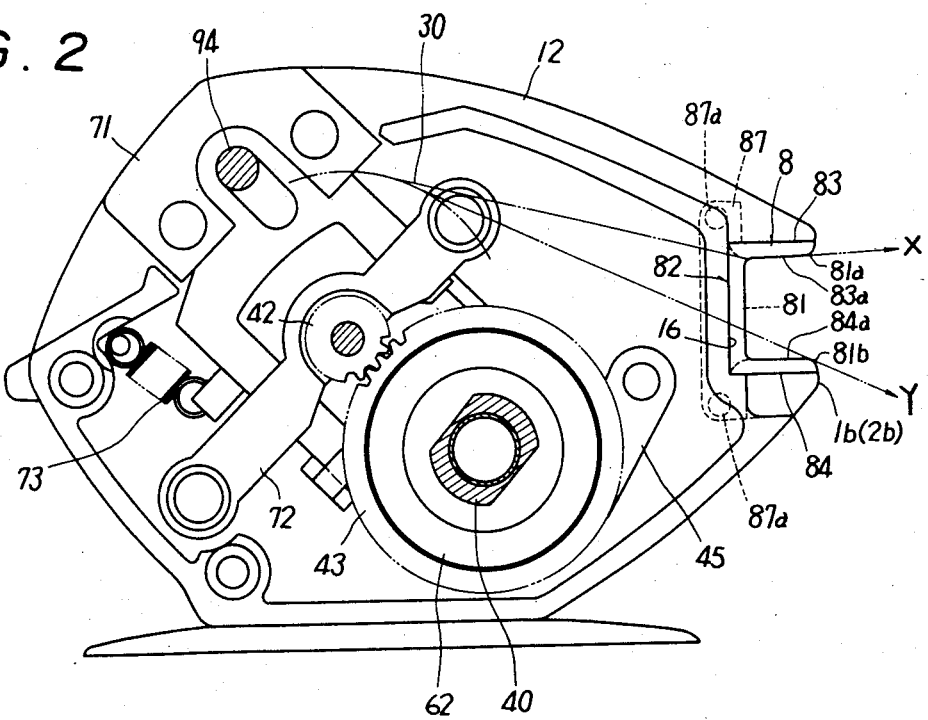
FIG. 2 is a side view of the fishing reel in FIG. 1 in a condition of removing a cup-shaped cover from a first side frame and of disconnecting the clutch means.

A typical embodiment of a fishing reel of the invention is shown in FIG. 1, which is provided with a reel body A having a pair of first and second side frames 1 and 2 opposite to each other and spaced apart a predetermined distance. First side frame 1 comprises a side plate 11, a doubling plate 12 which is attached thereto and which has at its central portion a bearing cylinder 14, and a cup-shaped cover 13. Second side frame 2 comprises a side plate 22 having a bearing housing 21 and a cup-shaped cover 23 attached to the side plate 22.

The bearing cylinder 14 and bearing housing 21 are provided with bearings $G_1$ and $G_2$ respectively, through which a spool shaft 3 having a spool 30 is rotatably supported. A tubular support shaft 15 is mounted to the doubling plate 12 and rotatably supports a drive shaft 40 one end of which projects outwardly and supports a handle 41, so that a driving force therefrom is transmitted to the spool shaft 3 through the drive shaft 40, a drag mechanism 6, a drive mechanism 4 and a clutch means 5, thereby driving the spool 30. A clutch lever 71 at a clutch operating mechanism 7 engages or disengages the clutch means 5 to drive spool 30 or enable it to be freely rotatable.

The clutch means 5 comprises flat faces provided at an intermediate portion of the spool shaft 3 and a cylinder which has a non-round inner surface engageable with the flat faces at the spool shaft 3 and is provided at a pinion 42 supported rotatably and axially slidably thereon. Clutch lever 71 is moved forwardly to move pinion 42 axially to disengage from the flat faces at the spool shaft 3, whereby the spool shaft 3 and the spool 30 fixed thereto are allowed to freely rotate.

The drive mechanism 4 comprises the handle 41, drive shaft 40, pinion 42, and a main gear 43 engageable therewith and supported rotatably on the projecting end of drive shaft 40 entering into the first side frame 1. Hence, a driving force is transmitted from the handle 41 to the spool shaft 3 through the drag mechanism 6 to be discussed below, main gear 43, pinion 42 and clutch means 5, thereby driving the spool 30. In addition, a stopper gear 44 is fixed to the drive shaft 40 and a stopper pawl 45 is pivoted to the doubling plate 12, which are engageable with each other to restrain the drive shaft 40 from reverse rotation, but are not indispensable.

The drag mechanism 6 comprises a pair of first and second drag washers 61 and 62 having friction plates 60, disposed at both sides of the main gear 43, and supported to the drive shaft 40; a drag lever 63 interposed between the second drag washer 62 and the handle 41; a washer 64 interposed between the drag lever 63 and the second drag washer 62; and a leaf spring 65. The first and second drag washers 61 and 62 are supported non-rotatably but axially movably to the drive shaft 40. Drag lever 63 screws with the drive shaft 40 so as to axially move the second drag washer 62 and press-contact the friction plates 60 with the main gear 43, thereby transmitting the driving force to the main gear 43 at a desired transmission torque through the second drag washer 62 and friction plate 60. The press-contacting force applied by the drag lever 63 to the friction plates 60 can be adjusted as desired so that the main gear 43, when subjected to a load overcoming the adjusted transmission torque, is adapted to slidably rotate with respect to the drive shaft 40.

The clutch operating mechanism 7 comprises a clutch yoke 72 holding the pinion 42 and urging it always in the direction of engaging the clutch means 5 and a furcate clutch lever 71 having an urging portion 71a for urging the clutch yoke 72. Clutch lever 71 is supported to the doubling plate 12 such that it is movable in reciprocation perpendicularly to the spool shaft 3. Hence, the clutch lever 71 is moved forwardly to axially move the clutch yoke 72, thereby moving the pinion 42 in the direction of disengaging the clutch means 5, and is moved backwardly to move the pinion 42 through the yoke 72 urged by a return spring 73, thereby engaging the clutch means 5.

The fishing reel of the invention constructed as described above is provided across both the side frames 1 and 2 with a guide member 8 having an elongate bore 81 extending axially of the spool 30 and positioned at both lengthwise ends inside the opposite inner surfaces of side frames 1 and 2. Elongate bore 81 forms at its overall periphery drawn-line guide surfaces (to be discussed below) comprising curved surfaces for guiding the line to be wound onto or drawn onto or out of the spool 30.

The embodiment of the invention illustrated in FIGS. 1 through 4 comprises a holding recess 16 or 24 at the front of each side frame 1 or 2 and across the front surface 1b or 2b, the inner surface 1a or 2a and the outer surface 1c or 2c in continuation of the front surface 1b or 2b, so that the guide member 8 is mounted to the recesses 16 and 24. The guide member 8, as seen from FIGS. 3 and 4, comprises a rectangular plate 82 having an elongate bore 81 approximately equal in length to a distance between the side frames 1 and 3 and a pair of lips 83 and 84 extending from both widthwise ends of the plate 82 perpendicularly to the plane thereof. Also, the guide member 8 is provided at an intermediate portion corresponding to the elongate bore 81 with mounting members 87 and 88 having projections 85 and 86 to be fitted into each two bore 17 and 25 provided at the side plates 11 and 22.

Also, at the four sides of the elongate bore 81 are formed first drawn-line guide surfaces 81a to 81d comprising curved surfaces for guiding thereon the line passing through the elongate bore 81. At the utmost ends of the lips 83 and 84 are formed second drawn-line guide surfaces 83a and 84a comprising curved surfaces for guiding the line pulled outwardly from the lips 83 and 84, and vertically with respect thereto, i.e., in the direction of the arrow X or Y in FIG. 2. Hence, the first and second drawn-line guide surfaces 81a to 81d and 83a and 84a avoid contact of the line with the edge of each side frame 1 or 2 even when the line is pulled in any direction with respect to the elongate bore 81, thereby reliably preventing the line from becoming worn or damaged.

The guide member 8 is formed of a lightweight material, such as a zinc alloy, subjected to surface treatment with an agent, such as hard chrome, and provided a wear resistance, thereby preventing the line from wearing. Alternatively, the guide member 8 may be formed of a material, such as a ceramic material or a fiber reinforced plastic. In this case, the surface treatment need not be applied due to proper selection of material. Also, the guide member 8 may be used as a connecting member for the side frames 1 and 2 for reinforcement thereof.

When the side frames 1 and 2 are connected with a connecting member 10, the projections 85 and 86 are fitted into the retaining bores 17 and 25 respectively, and a mounting screw bolt 20 is tightly screwed to fix the guide member 8 between the side frames 1 and 2, thereby mounting the guide member 8 to the fishing reel.

It should be noted that clutch lever 71 is not retained at the termination of its forward movement, but moves backwardly when released, after the forward movement, due to the action of return spring 73 interposed between the clutch lever 71 and the doubling plate 12.

Also, the fishing reel shown in the drawings is provided with a brake mechanism between the spool shaft 3 and the bearing housing 21 at the second side frame 2.

The brake mechanism comprises a first gear 50 having a tubular shaft 50a, a second gear 52 having a rubber O-ring 51 and engageable with the first gear 50, and a coiled clutch spring 53 actuated by rotation of the spool shaft 3. First gear 50 is supported rotatably to the spool shaft 3, and second gear 52 is supported rotatably to a shaft 54 projecting from the bearing housing 21 so that the O-ring 51 applies a predetermined rotational resistance to the second gear 52. The clutch spring 53 is wound slidably onto the tubular shaft 50a and spool shaft 3, so that when the clutch means 5 disengages and the line is drawn out from the spool 30, the spool shaft 3 rotates in reverse and the clutch spring 53 is tightly wound on the tubular shaft 50a and spool shaft 3, whereby a reverse torque is applied on the O-ring 51 through the first and second gears 50 and 52 to give a predetermined resistance to the second gear 52, in turn the reverse torque of spool shaft 3. Hence, the line is prevented from being drawn out excessively from the freely rotating spool 30. On the other hand, when the spool shaft 3 normally rotates to wind the line onto the spool 30, a slip is developed between the clutch spring 53, and the spool shaft 3 and tubular shaft 50a so that the spool shaft 3 is rotatable with respect to the first gear 50.

Main gear 43 is provided with engaging recesses 46, and drive shaft 40 axially movably supports an actuator engageable or disengageable with or from the engaging recesses 46. First side frame 1 is provided with an operating mechanism for the actuator 9.

Two engaging recesses 46 are provided at the inner surface of the center bore of the main gear 43 and are disposed at a phase difference of 180°. The actuator 9 comprises a clutch pin 91 having at both ends engaging portions engageable with the engaging recesses 46 respectively and a holder 92 holding the clutch pin 91. Holder 92 is held axially movably within a guide bore 47 provided at the center of drive shaft 40. Drive shaft 40 provides elongate slots 48 extending axially and open at the guide bore 47 so that the clutch pin 91 projects at both end engaging portions outwardly from the slots 48 respectively.

Between one end of the holder 92 and a mounting screw bolt 49 screwing with one end of the drive shaft 40 is interposed a coiled spring 93 for biasing the actuator 9 always in the direction of engaging the clutch pin 91 with the engaging recesses 46.

The operating mechanism for the actuator 9 comprises an operating lever 95 having a lever shaft 94, a cam shaft 96 abutting against the other end of the holder 92, and an associate plate 97 interposed between the operating lever 95 and the cam shaft 96. The lever shaft 94 is supported rotatably between the doubling plate 12 and the cup-shaped cover 13, and the associate plate 97 is interposed slidably between the doubling plate 12 and a guide plate 18 disposed at the inside thereof. Cam shaft 96 is supported only axially movably in a through bore provided at the center of support shaft 15.

A semicircular cam 98 engageable with the edge of associate plate 97 is provided at the utmost end of the lever shaft 94 so that the operating lever 95 is turned to slide the associate plate 97. A slanted cam face 96a is provided at one end of cam shaft 96, and an engaging bore 97a engageable with the cam face 96a is provided at the associate plate 97 so that the associate plate 97 slides to forcibly axially move the cam shaft 96, thereby actuating the holder 92 against the coiled spring 93.

Also, between the lever shaft 94 and the cup-shaped cover 13 is interposed a torsion spring 99 for maintaining the operating position of the operating lever 95, and between the associate plate 97 and the guide plate 18 is interposed a return spring (not shown).

When the fishing reel of the invention constructed as described above is used for fishing, the angler grips the line with his hand and draws it out from the spool 30 to a predetermined length, at which time the line is drawn out through the elongate bore 81. In this case, the line, even when pulled by the angler in any direction, is guided by the elongate bore 81, so that the line is not damaged by the side frame 1 or 2 coming in contact with the line. Hence, there is no risk that the line will be snapped or broken by a hooked fish.

Also, when the angler draws out the line, the brake mechanism applies a predetermined resistance against rotation of spool 30, whereby he can draw out the line with ease to a predetermined length only.

After the line is drawn out in a predetermined length, the clutch lever 71 is released to engage the clutch means so that the angler sets the reel in the line winding mode. When a fish is hooked, the handle 41 is rotated to transmit a driving force therefrom to the spool shaft 3 through the drive shaft 40, drag mechanism 6, main gear 43, pinion 42 and clutch means 5, thereby driving the spool 30 to wind the line thereon.

Alternatively, the guide member 8 may be fixed at the mounting members 87 and 88 to the side plates 11 and 22 by use of set screws instead of the connecting member 10. Also, one of the guide member 8 and side frame 1 or 2 may be provided with retaining bores and the other may be provided with projections engageable with the retaining bores, thereby fixing the guide member 8 to the side frames 1 and 2. Thus, the mounting means is not defined. Where the connecting member 10 for connecting the side frames 1 and 2 is utilized, mounting members 870 and 880 at a guide member 80, as shown in FIGS. 5 through 8, are provided with through bores 871 and 881 respectively and a reinforcing shaft 800 is fitted at both ends into the through bores 871 and 881 so that set screws 801 and 802 pass through side plate 11, doubling plate 12 and side plate 22, and screw with both the ends of the shaft 800 respectively.

In such construction, the shaft 800 also serves as a connecting member for connecting both the side frames 1 and 2. In addition, the guide member 80 shown in FIGS. 5 through 8, the same as guide member 8 in the first embodiment, is provided with a plate 820 having an elongate bore 810 and a pair of lips 830 and 840. Elongate bore 810 is provided with first drawn-line guide surfaces 810a through 810d. Lips 830 and 840 have at their utmost ends second drawn-line guide surfaces 830a and 840a respectively. Also, the mounting members 870 and 880, the same as in the first embodiment, have projections 850 and 860 to be fitted into the retaining bores 17 and 25 respectively.

Although several embodiments have been described, they are merely exemplary of the invention and not to be construed as limiting, the invention being defined solely by the appended claims.

What is claimed is:

1. A fishing reel, comprising a reel body having a pair of side frames, a spool disposed between said side frames and supported rotatably to said side frames, a drive mechanism for driving said spool, a clutch means for selectively engaging and disengaging said spool with said drive mechanism, and a guide plate having guide means defining an elongate bore which extends in a same direction as an axis of rotation of said spool, lengthwise ends of said elongate bore being positioned between opposite inner surfaces of said side frames, said guide plate being disposed between said side frames and in front of said spool, said elongate bore comprising curved guide surfaces for guiding line wound onto said spool, said guide plate being rectangular in shape and comprising a pair of lips extending from opposite sides of said guide plate in a direction substantially perpendicular to a plane of said plate, said elongate bore comprising corners which include first ones of said curved guide surfaces for guiding line passing through said elongate bore, said lips having utmost ends in said direction substantially perpendicular to said plane of said guide plate which comprise second ones of said curved guide surfaces for guiding line drawn outwardly from said lips and vertically with respect thereto.

2. A fishing reel as set forth in claim 1, wherein said guide member comprises mounting members interposed between said side frames for fixing said guide plate to said side frames.

3. A fishing reel as set forth in claim 2, further comprising fixing means interposed between said mounting members and inner surfaces of said side frames for fixing said guide plate to said mounting members, said fixing means comprising projections and retaining bores into which said projections are inserted.

* * * * *